Patented May 8, 1951

2,551,924

UNITED STATES PATENT OFFICE 2,551,924

ESTERS OF ETHYNYL SILICONIC ACID

Edith M. Boldebuck, Schenectady, N. Y., assignor to Pittsburgh Plate Glass Company, Allegheny County, Pa., a corporation of Pennsylvania No Drawing. Application April 1, 1947, Serial No. 738,717

6 Claims. (Cl. 260—448.8)

This invention relates to novel silicon compounds. The compounds which have been provided in accordance with this invention are esters of acetylenic orthosiliconic acid and hydroxy compounds having a hydroxy group which can be esterified by an acid. The acetylenic orthosiliconic acids herein contemplated have the following structure $$R_n[Si(OH)_m]_x$$

where R is a radical of the group consisting of —C≡C— and CH≡C—, $x$ is a number equal to the valence of R and $n$ and $m$ are small whole numbers between 1 and 3 inclusive, the sum of $n$ and $m$ being 4. These esters, which also may be considered as derivatives of silane, have the general formula $$R_n[Si(OR')_m]_x$$

where R' is a monovalent aryl, aliphatic or araliphatic radical derived from an organic compound having an esterifiable hydroxyl group and the structure R'OH and the remaining symbols are as defined above.

These siliconates may be prepared by reacting organic chlorosilicates or other organo silicon halide with a metal acetylide such as sodium acetylide, potassium acetylide or other alkali metal acetylide, usually in the presence of a suitable solvent preferably a polar solvent such as pyridine, dioxane, triethyl amine pyridine-ether mixtures, etc. Polar solvents are understood to be solvents which contain atoms or radicals in which the bond to the other portion of the molecule thereof results from capture of one or a pair of electrons by an atom as distinguished from bonds which are established by atoms by sharing a pair of electrons.

The reaction normally is conducted by adding the acetylide to the chlorosilicate which remains in excess at least until reaction is essentially complete. This inhibits secondary reactions which tend to form more complex siliconates. The reaction occurs at room temperature or below with evolution of considerable heat. In order to maintain proper control of the reaction and prevent excessive overheating the temperature of the reacting mixture is generally maintained at approximately room temperature, for example, 30° C. or below. Somewhat higher temperatures may be permitted if addition of the acetylide to the chlorosilicate is slow. However, the temperature of the reacting mixture may be much higher if necessary and at times some heating in the final stages may be desirable to drive the reaction to completion.

The reactions apparently proceed in accordance with the following equations:

$$(R'O)_mSiCl_n + nNaC\equiv CH \rightarrow nNaCl + (R'O)_mSi(C\equiv CH)_n$$

Certain side reactions also occur and the above process usually is accompanied by the formation of compounds of the types $$(R'O)_3\equiv Si—C\equiv C—Si\equiv (OR')_3$$

and

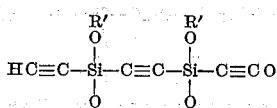

and even more complex compounds.

After reaction is complete as evidenced by discontinuance of the evolution of heat, the reaction mixture is filtered to remove the sodium chloride produced and the product distilled or otherwise treated to separate the components. The following examples are illustrative:

Example I

Sodium acetylide (NaC≡CH), 46 grams, was added slowly over a period of 2½ hours to a mixture of 150 grams of triethyl chlorosilicate $$Si(OC_2H_5)_3Cl$$

and 250 cubic centimeters of pyridine. The mixture was kept at a temperature of 0 to 15° C. during the addition and until heat evolution had ceased. After 2½ hours the mixture was filtered and fractionally distilled.

A 50 percent yield of a distillable liquid which analyzed to correspond to the compound $$CH\equiv C—Si(OC_2H_5)_3$$

was obtained. This liquid began to distill at 91–91.5° C. at 52 millimeters pressure. The boiling point at atmospheric pressure of this material is 163° C. It had a refractive index of 1.3982.

This product reacts with aqueous solutions of hydroxides such as NaOH or NH4OH to liberate acetylene. It is miscible with organic solvents such as dioxane or xylene.

The performance of this process frequently is accompanied by the formation of another higher boiling liquid which has an analysis corresponding to the formula $(C_2H_5O)_3-Si-C\equiv C-Si-(OC_2H_5)_3$ This product distills at 105 to 106° C. at one millimeter pressure. It is miscible with organic solvents such as dioxane or toluene and reacts with hydroxides to liberate acetylene.

*Example II*

20 grams of dry sodium acetylide was mixed with 36 cubic centimeters of diethyl dichlorosilicate and 100 cubic centimeters of pyridine was added. The mixture was heated slightly in a closed system whereupon a vigorous reaction took place. When initial reaction had subsided, the suspension was refluxed over night and then the pyridine was distilled off.

The residue was placed in a Claisen flask and distilled at 1 millimeter pressure and two fractions collected, the first being at 33-36° C. and the second, at 111-113° C. These fractions were collected and redistilled in a small side arm flask. The first fraction distilled at 31-32° C. at 1 millimeter pressure. This product is a colorless liquid which is not appreciably soluble in water and which analyzes to conform with the compound $(CH\equiv C)_2=Si=(OC_2H_5)_2$ A drop of this product placed upon a glass plate in air thickened within 48 hours to form a material which resembled a light wax.

The second fraction was collected at 93-106° C. at one millimeter pressure. This product is a water-insoluble colorless liquid which analyzes to conform with the compound $$(C_2H_5O)_2=Si-C\equiv C-Si=(OC_2H_5)_2$$
$$\qquad\qquad |\qquad\qquad |$$
$$\qquad\qquad C\qquad\qquad C$$
$$\qquad\qquad |||\qquad\qquad |||$$
$$\qquad\qquad CH\qquad\quad CH$$

This product converts upon standing in air to a hard transparent solid.

*Example III*

Ethyl trichlorosilicate, 0.1 mol was added to a mixture of pyridine, 75 cubic centimeters, and sodium acetylide (NaC≡CH), ⅓ mol, and considerable heat was generated. The resulting dark brown mixture was distilled and after removal of the pyridine, a fraction which distilled at 30-40° C. at one millimeter pressure was secured.

The same reaction was carried out in dioxane and a fraction which distilled at 39-41° C. at one millimeter pressure was obtained.

This liquid reacts violently with aqueous hydroxides such as NH₄OH to liberate acetylene. This compound has the probable structure $(CH\equiv C)_3Si(OC_2H_5)$ Corresponding acetylenic compounds may be prepared from other silicates. For example, acetylenic siliconic esters of other alcohols or hydroxy compounds such as methyl alcohol, n propyl alcohol, n butanol, isobutanol, lauryl alcohol, octyl alcohol, allyl alcohol, methallyl alcohol, propargyl alcohol, phenol, benzyl alcohol, stearyl alcohol, oleyl alcohol or other hydroxy compound containing a hydroxy radical which is esterifiable with an acid, preferably alcohols containing up to 10 carbon atoms, may be prepared by reacting the corresponding chlorosilicates with an acetylide such as sodium acetylide.

The above products are capable of numerous uses. Many of these materials polymerize or otherwise convert to solid polymers. Hence, these materials may be used in coating compositions or other resinous compositions as film forming agents, plasticizers or modifiers. Moreover, these agents usually decompose to yield acetylene and consequently may be used conveniently to supply acetylene to other reactions.

Although the present invention has been described with reference to the specific details of certain embodiments thereof, it is not intended that such details shall be regarded as limitations upon the scope of the invention except insofar as included in the accompanying claims.

What is claimed:
1. Triethoxy ethynyl silicane.
2. Diethoxydiethynyl silicane.
3. Ethoxytriethynyl silicane.
4. A method which comprises reacting a chlorosilicic ester with an alkali metal acetylide having the structure MC≡CH where M is alkali metal.
5. A method which comprises reacting an ethyl chlorosilicate with sodium acetylide.
6. An ester of a monohydroxy compound of the formula ROH, where R is a member of the group consisting of aryl, aliphatic and aralipathic hydrocarbon monovalent radicals which contain up to 10 carbon atoms and an acetylenic ortho silicic acid of a group consisting of

$(CH\equiv C)_n Si(OH)_m$ in which $n$ and $m$ are small whole numbers between 1 and 3 inclusive and the sum of $n$ and $m$ is 4, $(HO)_3\equiv Si-C\equiv C-Si(OH)_3$ and $$\qquad\quad OH\qquad\quad OH$$
$$\qquad\quad |\qquad\qquad |$$
$$HC\equiv C-Si-C\equiv C-Si-C\equiv CH$$
$$\qquad\quad |\qquad\qquad |$$
$$\qquad\quad OH\qquad\quad OH$$

EDITH M. BOLDEBUCK.

REFERENCES CITED

The following references are of record in the file of this patent:

UNITED STATES PATENTS

| Number | Name | Date |
|---|---|---|
| 2,082,569 | Carothers | June 1, 1937 |
| 2,386,452 | Fleming | Oct. 9, 1945 |
| 2,386,793 | Hanford | Oct. 16, 1945 |
| 2,413,582 | Rust | Dec. 31, 1946 |

OTHER REFERENCES

Volnov: "Jour. Gen. Chem." (U. S. S. R.), vol. 16 (1940), pages 1600-1604.

Fieser: "Organic Chemistry" (1944) page 78, Heath & Co.

Hurd: "Jour. Am. Chem. Soc.," vol. 71, pages 755-756.